US012108201B1

(12) United States Patent
Mai

(10) Patent No.: US 12,108,201 B1
(45) Date of Patent: Oct. 1, 2024

(54) USB GAME MICROPHONE WITH DOUBLE SOUND CARD OUTPUT DEVICES

(71) Applicant: Shenzhen Xunweijia Technology Development Co., Ltd., Shenzhen (CN)

(72) Inventor: Qibin Mai, Gaoyao (CN)

(73) Assignee: Shenzhen Xunweijia Technology Development Co., Ltd., Shenzhen (CN)

(*) Notice: Subject to any disclaimer, the term of this patent is extended or adjusted under 35 U.S.C. 154(b) by 0 days.

(21) Appl. No.: 18/405,131

(22) Filed: Jan. 5, 2024

(30) Foreign Application Priority Data

Dec. 28, 2023 (CN) ........................ 202311826245.5

(51) Int. Cl.
*H04R 1/08* (2006.01)
*H04R 3/00* (2006.01)

(52) U.S. Cl.
CPC ................. *H04R 1/08* (2013.01); *H04R 3/00* (2013.01); *H04R 2410/03* (2013.01)

(58) Field of Classification Search
CPC ... H04R 1/00; H04R 1/02; H04R 1/04; H04R 1/08; H04R 1/083; H04R 3/00; H04R 3/005; H04R 3/028; H04R 3/04; H04R 3/10
See application file for complete search history.

(56) References Cited

U.S. PATENT DOCUMENTS

| | | | | |
|---|---|---|---|---|
| 2004/0029637 A1* | 2/2004 | Hein, Jr. | .................. | H03G 3/32 463/35 |
| 2007/0036368 A1* | 2/2007 | Hettinger | ............... | H03G 3/344 381/107 |

FOREIGN PATENT DOCUMENTS

| | | | | |
|---|---|---|---|---|
| CN | 202679572 U | * 1/2013 | ............... | H04R 1/08 |
| CN | 205005230 U | * 1/2016 | ............... | H04R 1/08 |
| CN | 205179297 U | * 4/2016 | ............... | H04R 1/08 |
| CN | 207427395 U | * 5/2018 | ............... | H04R 1/08 |
| CN | 106254976 B | * 12/2018 | ............... | H04R 1/08 |
| CN | 112073876 B | * 7/2021 | ............... | H04R 1/08 |
| CN | 114615596 A | * 6/2022 | ............... | H04R 3/00 |
| CN | 216752024 U | 6/2022 | | |
| CN | 217159942 U | 8/2022 | | |
| CN | 218570404 U | 3/2023 | | |

* cited by examiner

*Primary Examiner* — Thang V Tran
(74) *Attorney, Agent, or Firm* — Nitin Kaushik

(57) ABSTRACT

Disclosed is a USB game microphone with double sound card output devices, which belongs to the technical field of microphones. The USB game microphone includes a master chip, a headphone amplifier chip circuit, a microphone core, and a master volume potentiometer, wherein the master chip is at least provided with two sound cards and is further electrically connected to a hybrid potentiometer, outputs of the two sound cards are filtered by an operational amplifier low-pass filter after being adjusted in an equal proportion by the hybrid potentiometer, and signals of left and right sound channels are amplified and outputted by the headphone amplifier chip circuit. The master chip is further electrically connected to a touch switch and a light touch switch, the touch switch controls the mute switching of the microphone, and the light touch switch is used for switching the noise reduction of the microphone.

6 Claims, 13 Drawing Sheets

USB GAME MICROPHONE WITH DOUBLE SOUND CARD OUTPUT DEVICES

CROSS-REFERENCE TO RELATED APPLICATIONS

The application claims priority to Chinese patent application No. 2023118262455, filed on Dec. 28, 2023, the entire contents of which are incorporated herein by reference.

TECHNICAL FIELD

The present disclosure belongs to the technical field of microphones, and in particular relates to a USB game microphone with double sound card output devices.

BACKGROUND

With the continuous progress of society, people's requirements are continuously improved. Especially, for game enthusiasts, their requirements for game equipment are getting higher and higher. The game equipment is more and more convenient to use. For functional requirements of a product, more customized and personalized requirements are also required. A USB game microphone sold on the market at present basically has microphone volume adjustment, headphone volume adjustment, headphone interface and lamp effects, one speaker output device mapped on a computer, and one sound record input device. However, when such a microphone is actually used by a game enthusiast, a problem that a user has to not only listen to a background sound of his own game, but also listen to sounds of his online teammates when playing games on line, will occur, Since there is only one computer output mapping device, volumes of voices of the online teammates and a volume of the background sound of the game cannot be distributed separately. It also leads to the inability to adjust the background sound of the game and the voices of the teammates separately. The proportions of the sound of the background and the voices of the teammates cannot be adjusted, so that volumes of both of the voices and the sound of the background are high while a volume of a sound of a headphone is adjusted to be high, and the proportions cannot be freely controlled, which do not satisfy functional requirements of the enthusiasts. Therefore, a USB game microphone with double sound card output devices is provided to solve the above problems.

SUMMARY

The object of the present disclosure is to provide a USB game microphone with double sound card output devices, which aims at solving the problems in the background art that a USB board game microphone sold on the market at present has no double sound card output function and is incapable of selecting output devices separately or adjusting proportions of volumes of voices of teammates and a background sound of a game. In order to achieve the object, the present disclosure adopts the technical solution that the USB game microphone with double sound card output devices includes a master chip, a headphone amplifier chip circuit, a microphone core, and a master volume potentiometer, wherein the master chip is at least provided with two sound cards and is further electrically connected to a hybrid potentiometer, outputs of the two sound cards are filtered by an operational amplifier low-pass filter after being adjusted in an equal proportion by the hybrid potentiometer, and signals of left and right sound channels are amplified by the headphone amplifier chip circuit. By adopting the technical solution, the problems that the USB board game microphone sold on the market at present has no double sound card output function and is incapable of selecting output devices separately are solved. By adopting the technical solution, proportions of two output channels can be adjusted, so that proportions of sounds can be adjusted, and the proportions of the volumes of the sounds of the teammates or the sound of the game background can be adjusted by the hybrid potentiometer on a microphone main body during a game.

Further, the headphone amplifier chip circuit is connected to a headphone interface, and the headphone interface is a 3.5 mm interface. In other technical solutions, the headphone amplifier chip circuit is integrated with a wireless communication module so as to be connected to a wireless headphone.

The foregoing solution is further described as: the microphone core is connected to a microphone input circuit, a microphone potentiometer and the master chip in sequence. An analog signal is collected by the microphone core and is processed by the microphone input circuit, is then adjusted by an operational amplifier circuit of the microphone and the microphone potentiometer, is finally processed in the master chip, and is then uplinked to a computer.

Preferably, the master chip is further electrically connected to a touch switch and a light touch switch, the touch switch is used for controlling the mute switching of the microphone, and the light touch switch is used for switching the noise reduction of the microphone.

Further, the master chip is connected to an external connection device by a USB interface which is a TYPE-C interface. In other technical solutions, the master chip may be integrated with a wireless communication module for wireless connection with a smart device such as a computer and a mobile phone.

Preferably, the master chip is further electrically connected to a lamp control chip and a lamp effect switching switch, the lamp control chip is electrically connected to lamp beads in a plurality of lamp areas, and a lamplight mode is changed by the lamp effect switching switch.

The foregoing solution is further described as: the microphone includes a shell, a base, and a blowout control cover, wherein the blowout control cover is mounted on a side of the shell, and the shell is rotatably mounted on the base by a rotary arm. The master chip, the headphone amplifier chip circuit and the microphone core are mounted inside the shell, the touch switch is mounted on the top of the shell, the shell is divided into three lamp areas respectively located in the bottom, middle and top of the shell, the light touch switch, the lamp effect switching switch and the headphone interface are located on the bottom of the shell, the hybrid potentiometer, the master volume potentiometer and the microphone potentiometer are mounted on the shell, and forward and reverse ends of the hybrid potentiometer are respectively 100% outputs of the two sound cards.

Compared with the prior art, the present disclosure has the following beneficial effects:

1. According to the present disclosure, the two sound cards are disposed in the master chip, and the two sound cards are connected to the hybrid potentiometer; proportions of the two output channels are adjusted by the hybrid potentiometer, and thus, proportions of volumes of sounds outputted by the different sound cards are adjusted; and 2. The output devices can be selected separately, and thus, proportions of a background sound of a game and a voice of a chat can be directly adjusted during game and chat, and disturbance from other sounds can be effectively avoided.

Figure 1A:
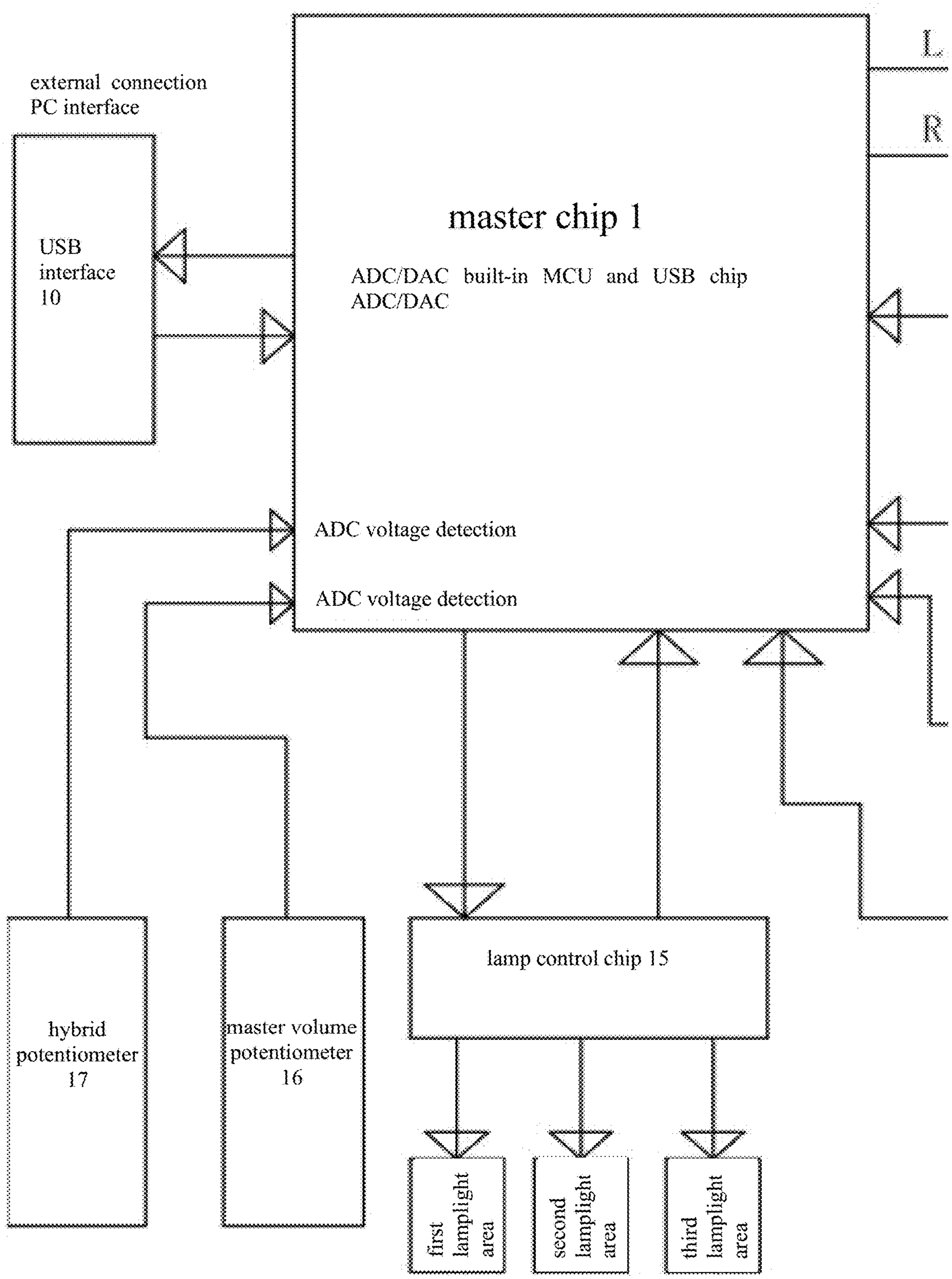
FIGS. 1A and 1B is a schematic diagram of an overall principle provided in an embodiment of the present disclosure.

Wherein reference numerals in each accompanying drawing are shown as:

1. master chip; 10, USB interface; 11, headphone interface; 12, microphone potentiometer; 13, touch switch; 14, light touch switch; 15, lamp control switch; 151, lamp effect switching switch; 16, master volume potentiometer; 17, hybrid potentiometer; 18, indicator lamp; 2, shell; 3, base; 4. blowout control cover.

DETAILED DESCRIPTION OF THE EMBODIMENTS

In order to facilitate understanding the present disclosure, the present disclosure will be more comprehensively described below with reference to related accompanying drawings. Preferred implementations of the present disclosure are given in the accompanying drawings. However, the present disclosure may be achieved in many different forms which are not limited to implementations described herein. On the contrary, these implementations are provided for more thoroughly and comprehensively understanding contents disclosed in the present disclosure.

The technical solutions of the present patent will be further described in detail below in conjunction with specific implementations.

Figure 1B:
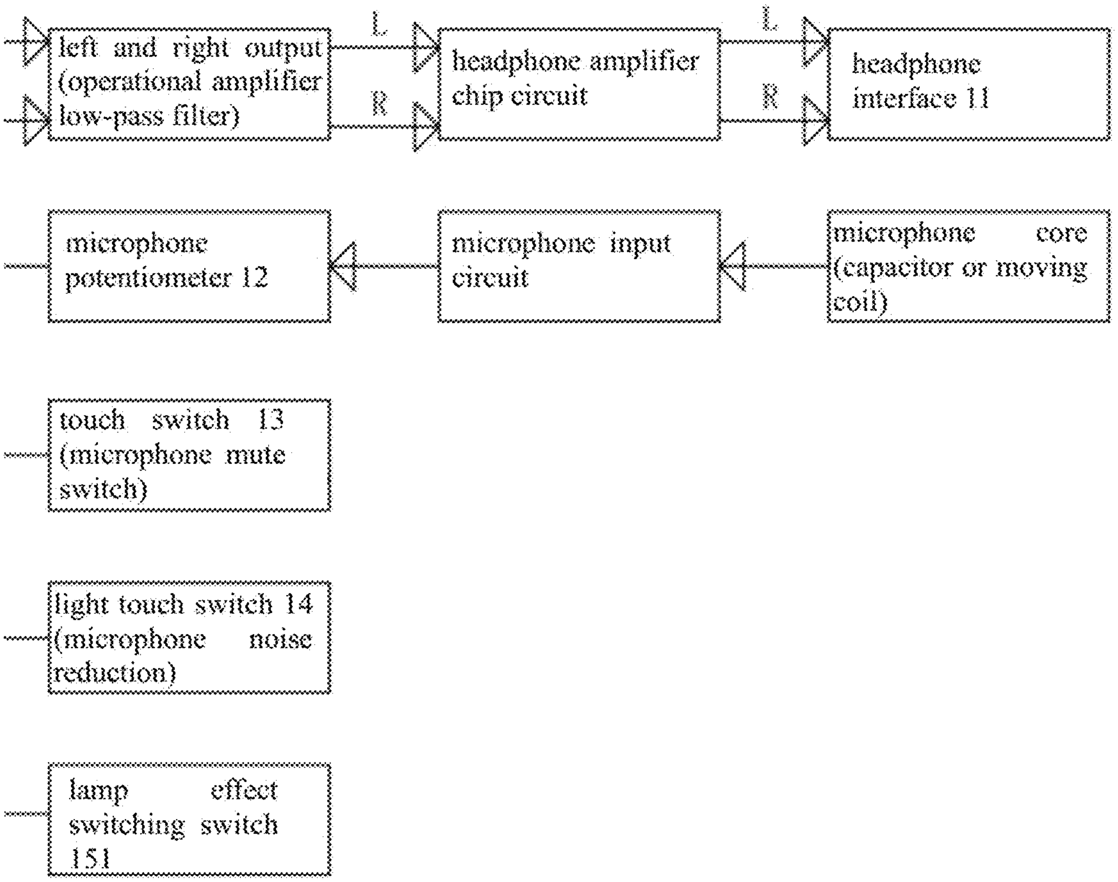
Figure 2A:
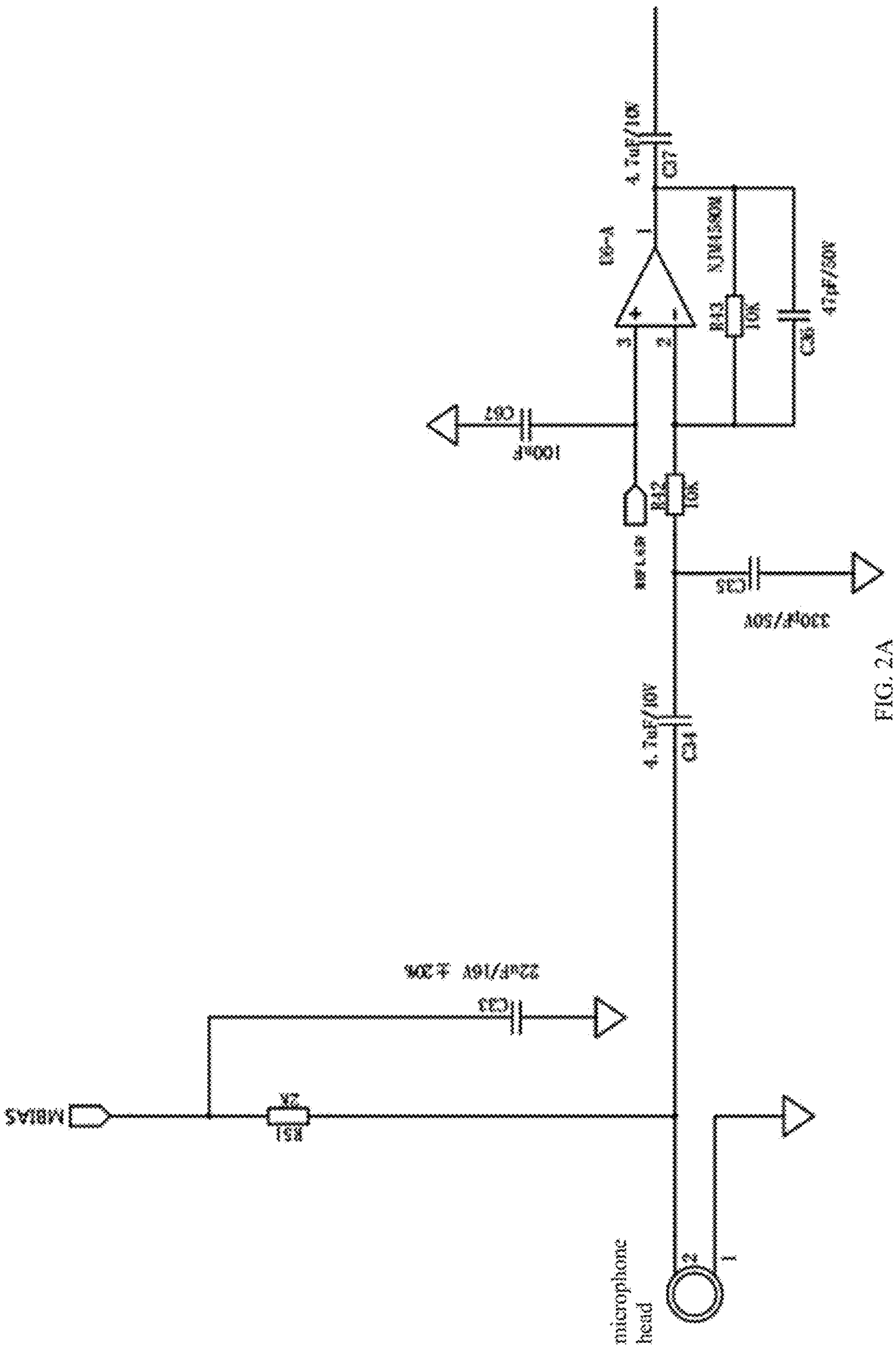
FIGS. 2A and 2B is a diagram of a microphone input amplifier circuit provided in an embodiment of the present disclosure.
Figure 2B:
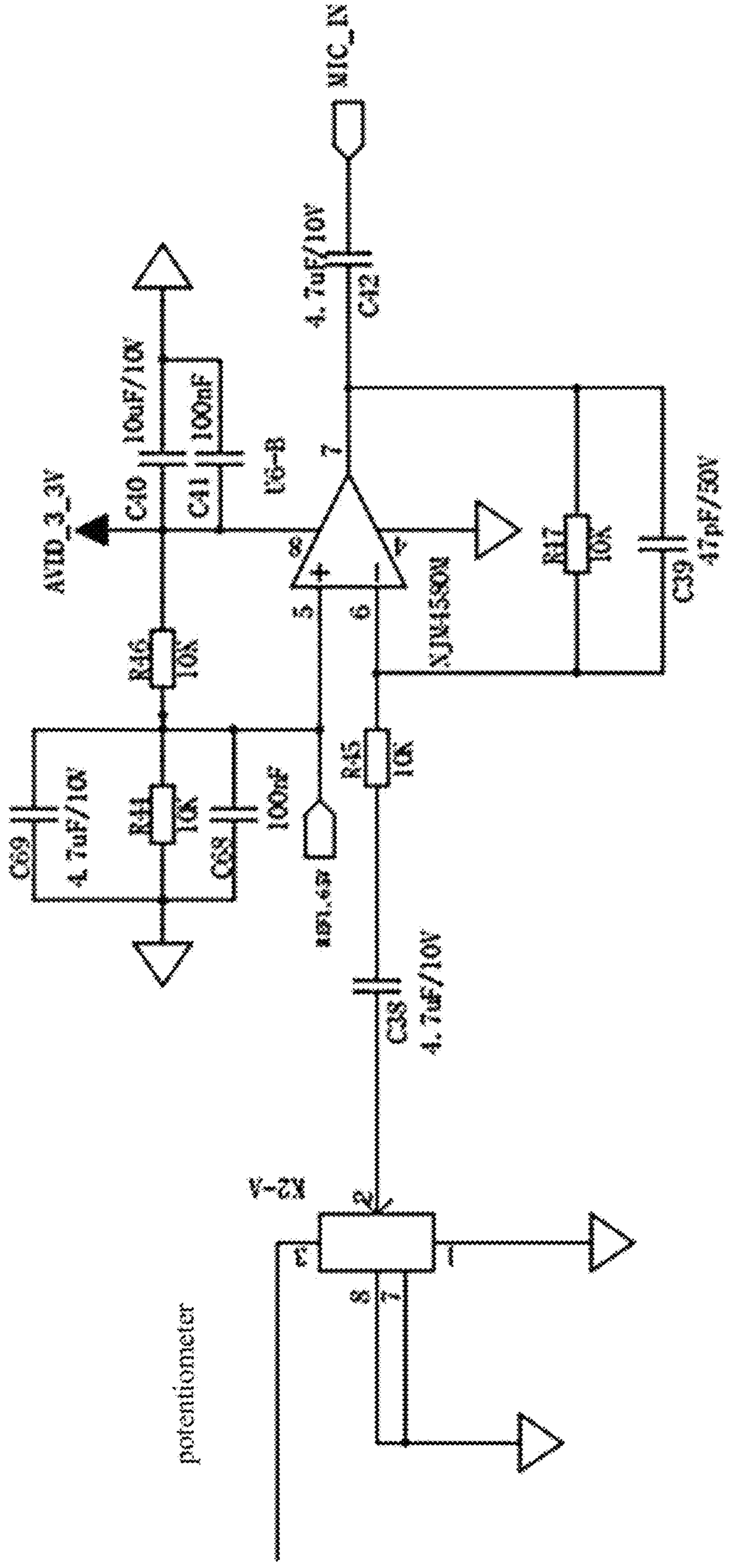
Figure 3:
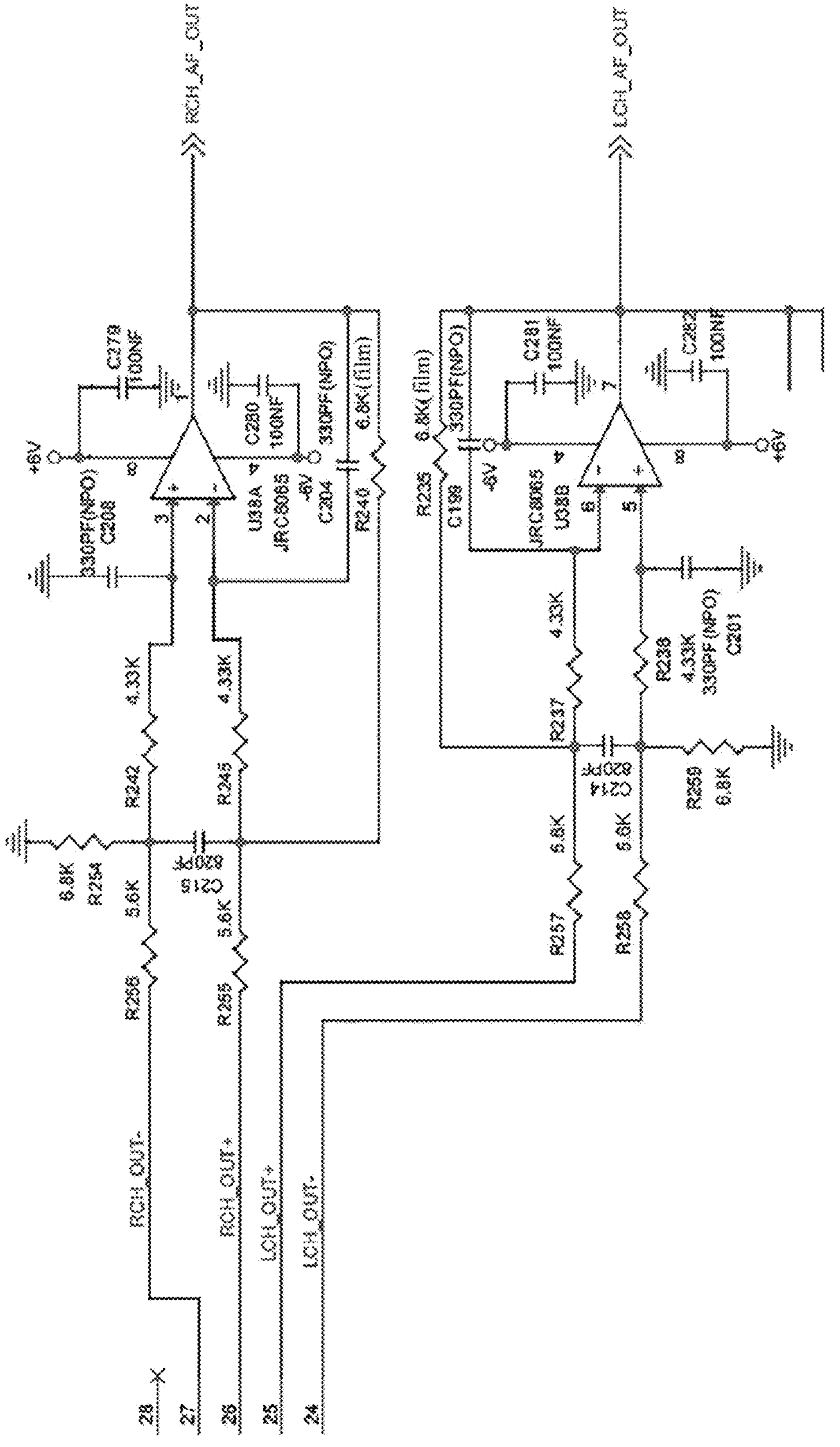
FIG. 3 is a diagram of an audio signal output circuit provided in an embodiment of the present disclosure.
Figure 4:
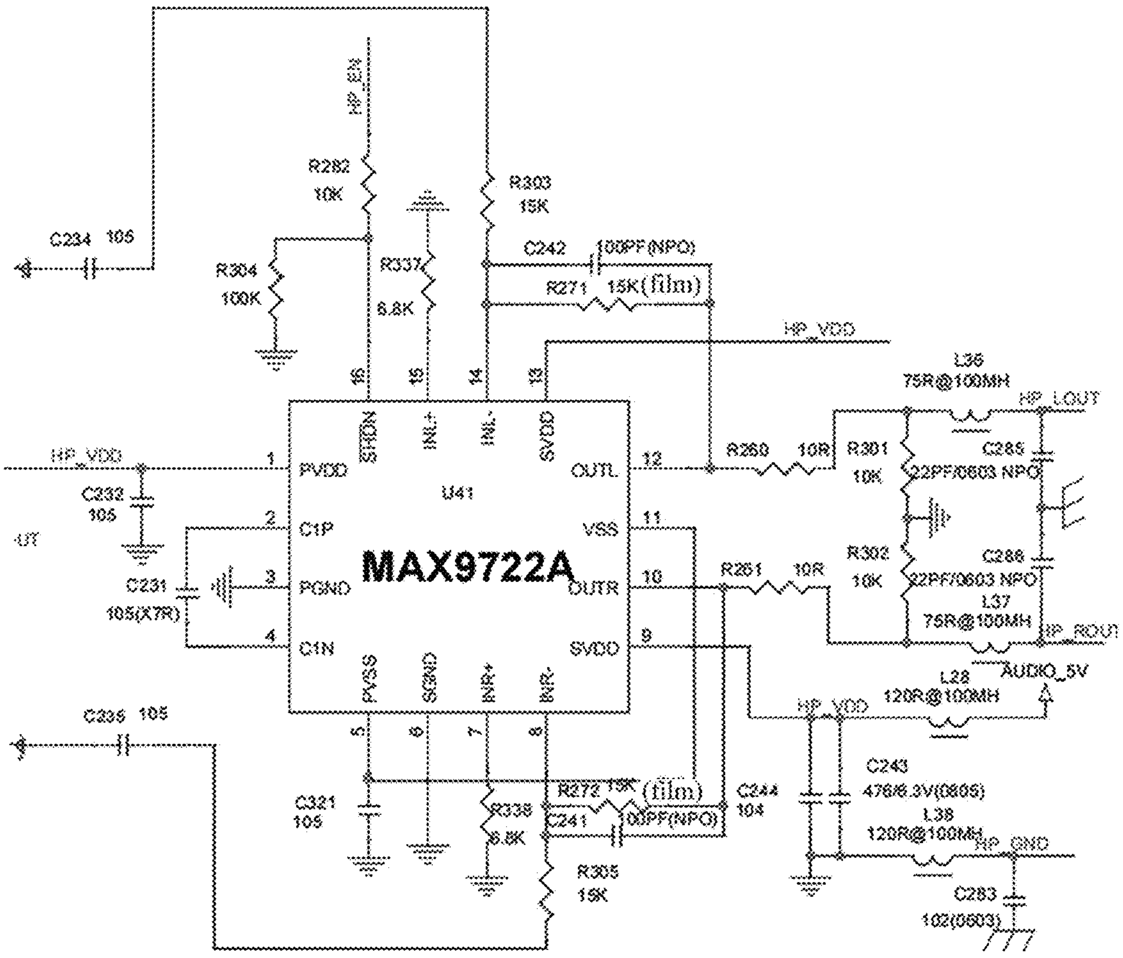
FIG. 4 is a diagram of a headphone amplifier circuit provided in an embodiment of the present disclosure.
Figure 6A:
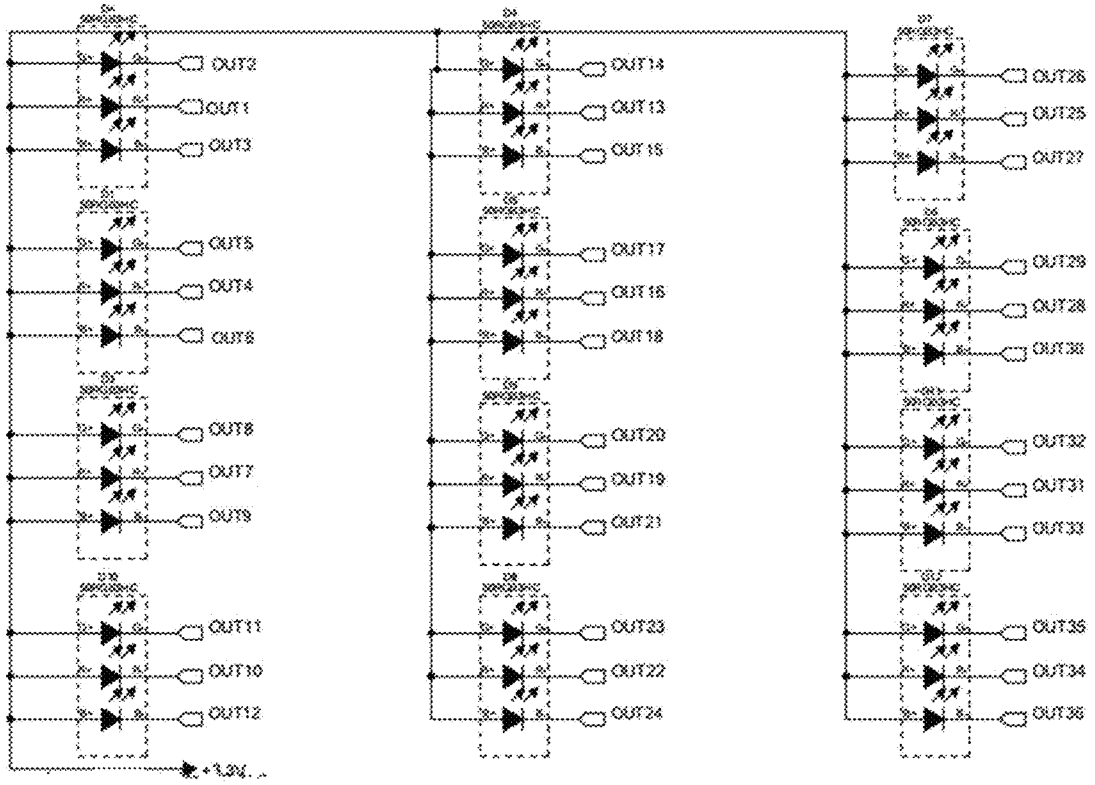
FIGS. 6A and 6B is a diagram of an atmosphere lamp circuit provided in an embodiment of the present disclosure.
Figure 6B:
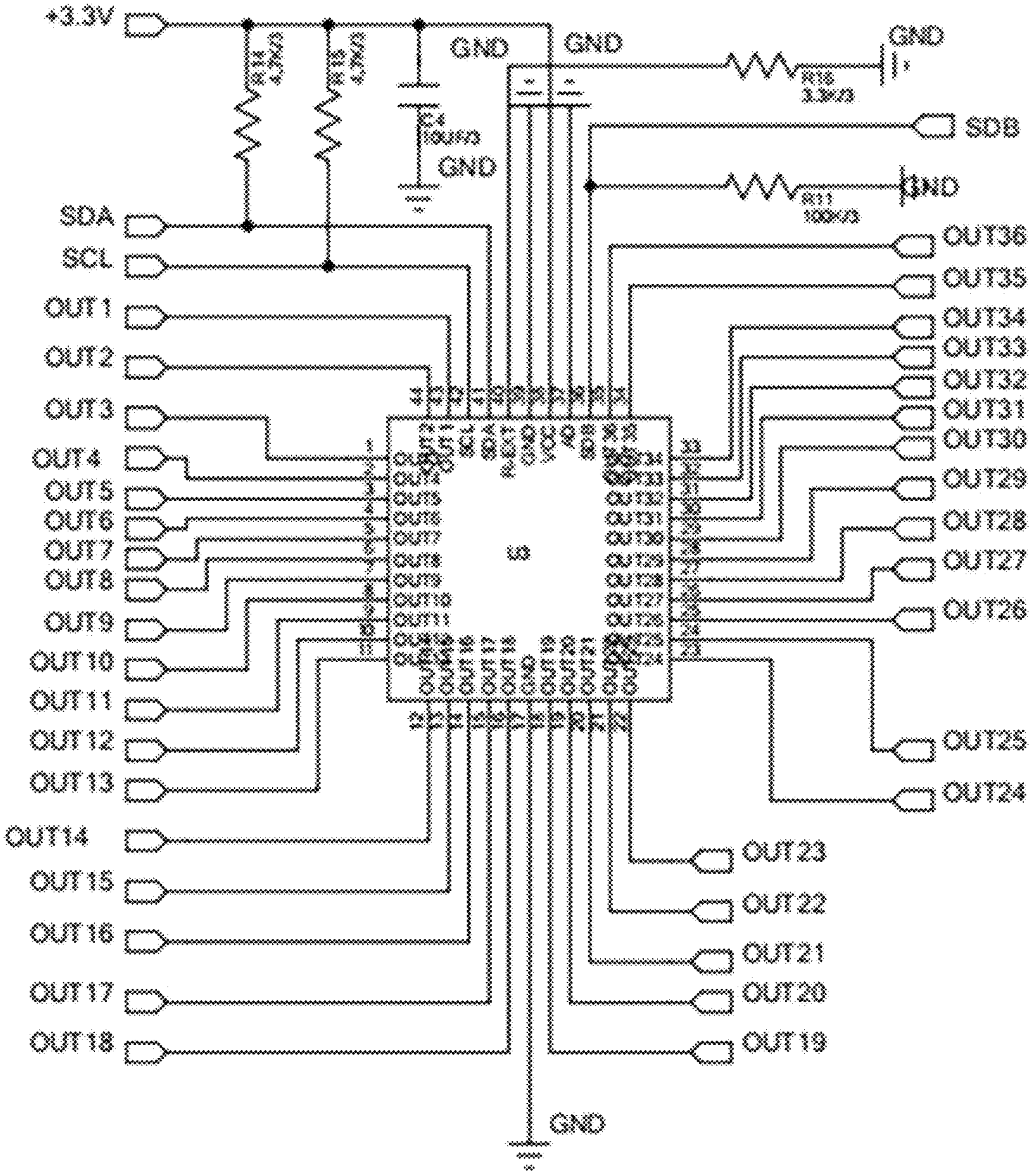
Figure 7:
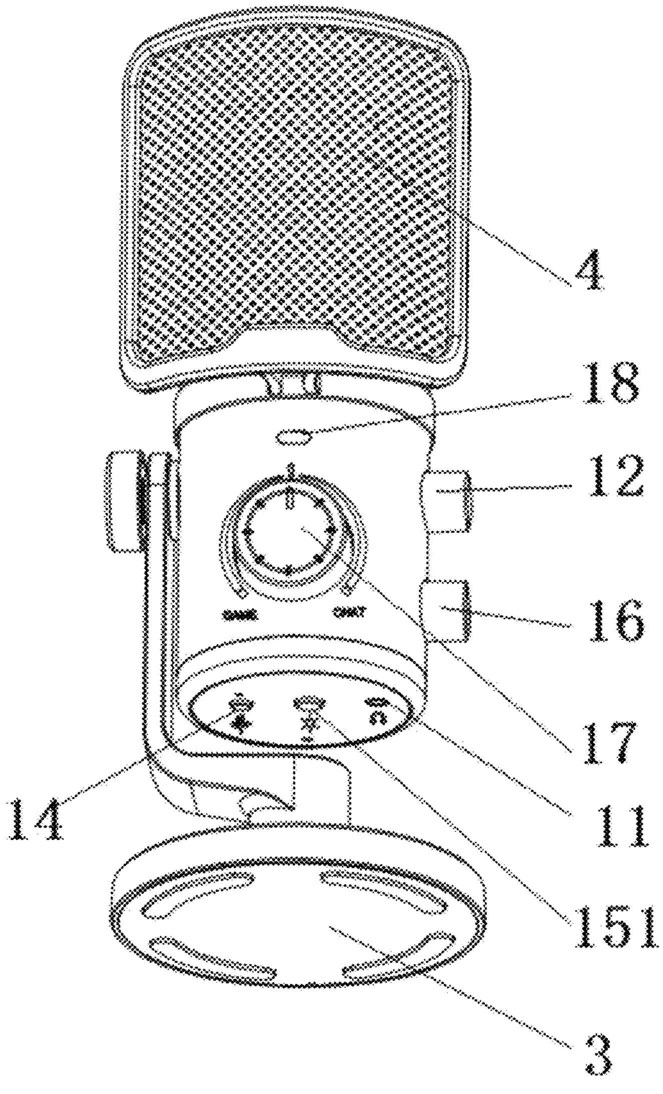
FIG. 7 is a schematic diagram of an overall structure provided in an embodiment of the present disclosure.
Figure 8:
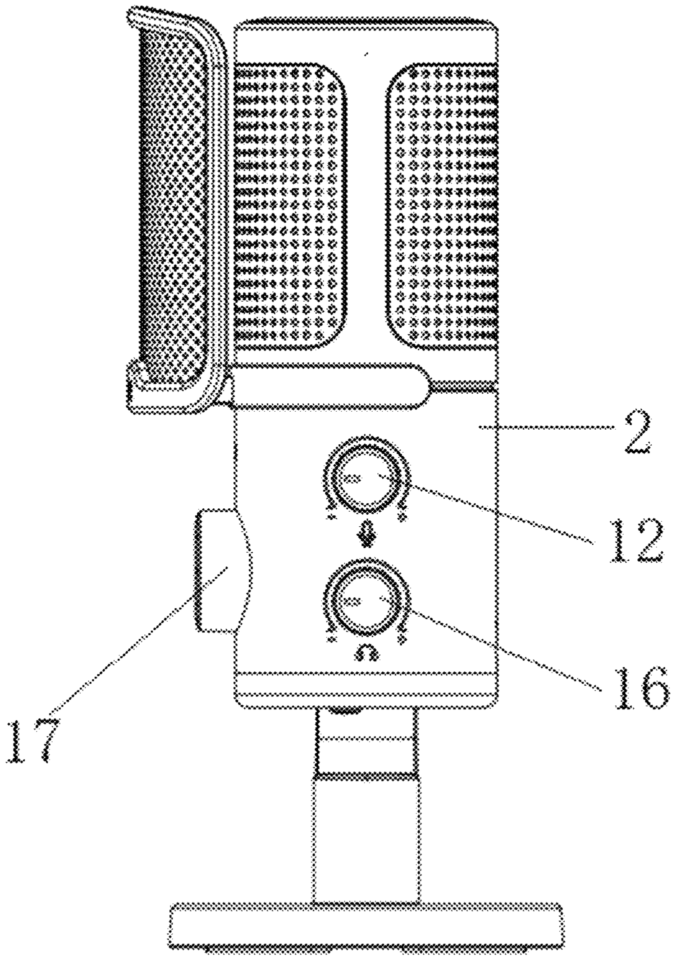
FIG. 8 is a schematic diagram of a lateral structure provided in an embodiment of the present disclosure.
Figure 9:
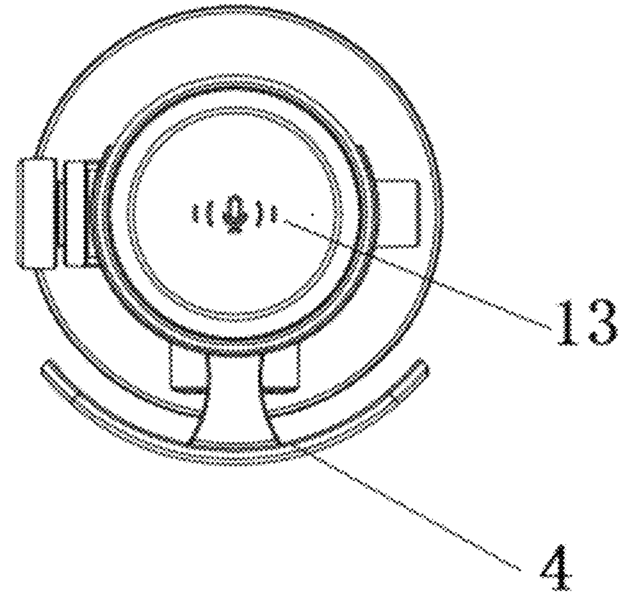
FIG. 9 is a schematic diagram of a top-view structure provided in an embodiment of the present disclosure.

As shown in FIGS. 1 to 9, in order to solve the problems that a USB board game microphone sold on the market at present has no double sound card output function and is incapable of selecting output devices separately or adjusting proportions of volumes of voices of teammates and a background sound of a game, the present disclosure provides a USB game microphone with double sound card output devices, as shown in FIGS. 1A and 1B, including a master chip 1, a headphone amplifier chip circuit, a microphone core, and a master volume potentiometer 16, wherein the master chip 1 is at least provided with two sound cards and is further electrically connected to a hybrid potentiometer 17, outputs of the two sound cards are filtered by an operational amplifier low-pass filter after being adjusted in an equal proportion by the hybrid potentiometer 17, and signals of left and right sound channels are amplified by the headphone amplifier chip circuit. As shown in FIG. 4, the headphone amplifier chip circuit is connected to a headphone interface 11, and the headphone interface 11 is a 3.5 mm interface. In other technical solutions, the headphone amplifier chip circuit is integrated with a wireless communication module so as to be connected to a wireless headphone. As shown in FIGS. 2A and 2B, the microphone core is connected to a microphone input circuit, a microphone potentiometer 12 and the master chip 1 in sequence. An analog signal is collected by the microphone core and is processed by the microphone input circuit, is then adjusted by an operational amplifier circuit of the microphone and the microphone potentiometer 12, is finally processed in the master chip 1, and is then uplinked to a computer. The master chip 1 is further electrically connected to a touch switch 13 and a light touch switch 14, the touch switch 13 is used for controlling the mute switching of the microphone, and the light touch switch 14 is used for switching the noise reduction of the microphone. The master chip 1 is connected to an external connection device by a USB interface 10 which is a TYPE-C interface. In other technical solutions, the master chip 1 may be integrated with a wireless communication module for wireless connection with a smart device such as a computer and a mobile phone. As shown in FIGS. 7, 8 and 9, the microphone includes a shell 2, a base 3, and a blowout control cover 4, wherein the blowout control cover 4 is mounted on a side of the shell 2, and the shell 2 is rotatably mounted on the base 3 by a rotary arm. The master chip 1, the headphone amplifier chip circuit and the microphone core are mounted inside the shell 2, the touch switch 13 is mounted on the top of the shell 2, the shell 2 is divided into three lamp areas respectively located in the bottom, middle and top of the shell 2, the light touch switch 14, the lamp effect switching switch 151 and the headphone interface 11 are located on the bottom of the shell 2, the hybrid potentiometer 17, the master volume potentiometer 16 and the microphone potentiometer 12 are mounted on the shell, and forward and reverse ends of the hybrid potentiometer 17 are respectively 100% outputs of the two sound cards.

As shown in FIGS. 2A and 2B which is a diagram of a microphone input amplifier circuit, a signal of the microphone core is coupled to an R42 input end by C34; then, inverting amplification is performed by a U6-A operational amplifier to change an impedance: then, the signal is output and is coupled to a potentiometer by C37, and a volume of the microphone is adjusted: then, the signal is amplified by a headphone operational amplifier NJM4580M; then, the signal is coupled to a signal input pin of the master chip 1 by C42, and thus, an uplink microphone channel is completed. As shown in FIG. 3 which is a diagram of an audio signal output circuit, a differential signal is outputted by the master chip 1, is subjected to differential-to-single-end conversion after being actively filtered by operational amplifiers U38B and U38A, and is outputted to the next-level of headphone amplifier circuit so as to be used.

As shown in FIG. 4 which is a diagram of a headphone amplifier circuit, after being obtained after an audio signal is actively filtered, a signal is inputted to an MAX9722A headphone amplifier chip by left and right sound channels, a voltage and a current of the signal are amplified, then, the signal is outputted by pin 10 and pin 12 and is outputted to a headphone socket by resistors R260 and R261, and a sound may be obtained by external connection with a headphone.

Figure 5A:
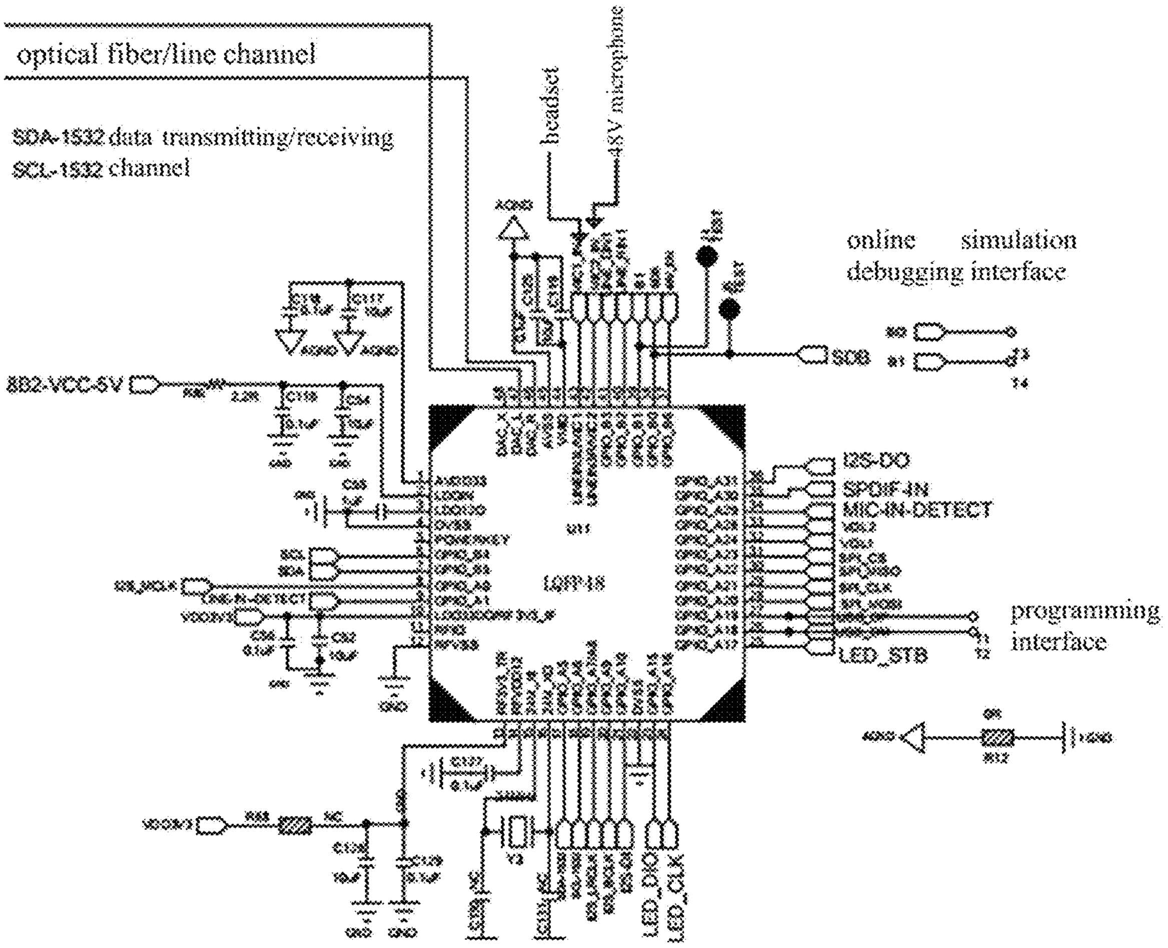
FIGS. 5A and 5B is a diagram of a master chip circuit provided in an embodiment of the present disclosure.
Figure 5B:
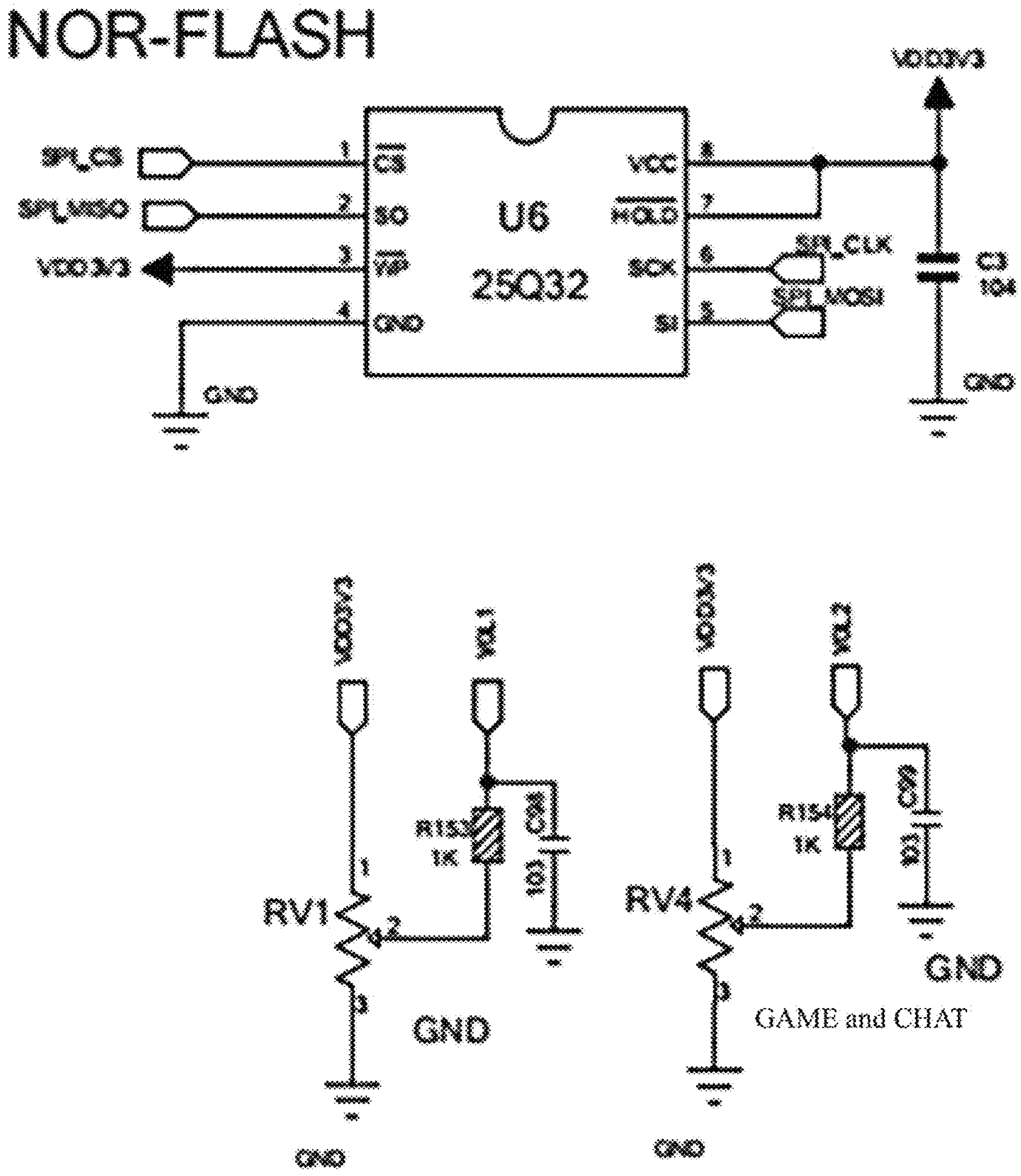

As shown in FIGS. 5A and 5B which is a diagram of a master chip circuit, RV1 is externally connected to a 3.3V voltage connected to one of taps, the other tap is grounded, and pin 2 of a middle tap is connected to R153 and C99 to form an RC filter, and is then connected to a volume VOL1 of the chip to perform voltage detection. The volume of the headphone is adjusted according to the voltage. Pin 1 of an RV2 potentiometer (the hybrid potentiometer 17) is externally connected to a 3.3V voltage, pin 3 is grounded, a voltage outputted by pin 2 of a central tap is inputted to pin 1 of the master chip after being subjected to RC filtration by R154 and C98, and proportions of volumes of GAME and CHAT are determined by such a voltage, and thus, proportions of the two sound cards can be adjusted by a volume potentiometer on a microphone main body. As shown in FIGS. 6A and 6B which is a diagram of an atmosphere lamp circuit, the master chip 1 outputs data control U3, then, U3 (a driving chip) controls RGB lamps, and thus, effects of colors such as red, orange, yellow and green are achieved.

At the same time, the present disclosure further additionally provides the touch switch 13 which is used for mute touching and mute switching of the microphone and is indicated by an indicator lamp 18. A lamplight atmosphere lamp is further provided, and the lamplight atmosphere lamp is divided into three areas. The noise reduction function of the microphone can also be turned on and off by the light touch switch 14.

In order to more thoroughly and comprehensively understand the contents disclosed in the present disclosure, the principle thereof will be further explained below in conjunction with a usage mode.

During actual usage, the microphone in the present disclosure is connected to a computer by the TYPE-C interface, by this time, information of the two sound cards may be mapped on the computer. In the present embodiment, two sound card output devices are respectively named as a Game device and a Chat device, wherein the Game device is used for outputting a background sound during game, and the Chat device is used for outputting voices of chat among teammates during game. During online game, one of output sound card devices, i.e., the Game device, is selected for the background sound of the game, and the Chat device is selected as a teammate voice output device. After such setting, proportions of volumes of a background sound of a game and sounds of online teammates may be adjusted by the hybrid potentiometer 17 on the microphone, and then, monitoring is achieved by connecting a headphone output interface in the microphone to a headphone. The background sound of the game and the online voices of the teammates can be adjusted at will, as shown in FIG. 7, if it is expected that the volume of the background sound of the game is higher, the hybrid potentiometer 17 is rotated to a Game direction, in this way, the volume of the background sound is high, and the volumes of the voices are low; if it is expected that the volumes of the voices are higher, the hybrid potentiometer 17 is rotated to a Chat direction, in this way, the volumes of the voices are high, and the volume of the background sound is low. Thus, user experience is improved, and an happiness index of a user playing a game is increased.

It should be noted that when one element is known as "fixed on" the other element, it may be directly located on the other element or there may be a centered element. When one element is regarded as "connected to" the other element, it may be directly connected to the other element or there may be a centered element at the same time. On the contrary, when one element is known as "directly" located "on" the other element, there is no middle element. Terms "vertical", "horizontal", "left", "right" and similar expressions used herein are merely for the purpose of description, but do not show a unique implementation, and terms "upper end", "lower end", "left", "right", "front end", "rear end" and similar expressions used herein refer to positional relationships in the accompanying drawings.

Unless defined otherwise, all technical and scientific terms used herein have the same meanings as commonly understood by those of ordinary skill in the art to which the present disclosure belongs. Herein, the terms used in the description of the present disclosure are merely for the purpose of describing specific implementations, rather than to limit the present disclosure. The term "and/or" used herein includes any and all combinations of one or more related listed items.

The above implementations are merely intended to describe the present disclosure, rather than to limit the present disclosure. Those of ordinary skill in the related art may further make various variations and modifications without departing from the spirit and scope of the present disclosure, and therefore, all equivalent technical solutions also fall within the scope of the present disclosure. The patent protection scope of the present disclosure shall be limited by the claims.

What is claimed is:

1. A USB game microphone with double sound card output devices, comprising:
- a master chip,
- a microphone potentiometer electrically connected to the master chip,
- a microphone input circuit electrically connected to the microphone potentiometer,
- a microphone core electrically connected to the microphone input circuit,
- an operational amplifier low-pass filter electrically connected to the master chip,
- a headphone amplifier chip circuit electrically connected to the operational amplifier low-pass filter, and
- a hybrid potentiometer electrically connected to the master chip,
- wherein the microphone core is configured to collect an analog signal, and the analog signal is processed by the microphone input circuit, adjusted by the microphone potentiometer and then processed in the master chip, and wherein the master chip is at least provided with two sound cards, the analog signal is processed by the two sound cards in the master chip, outputs of the two sound cards are filtered by the operational amplifier low-pass filter after being adjusted in an equal proportion by the hybrid potentiometer to generate signals of left and right sound channels, and the signals of left and right sound channels are amplified by the headphone amplifier chip circuit.

2. The USB game microphone with double sound card output devices according to claim 1, wherein the USB game microphone further comprises a headphone interface electrically connected to the headphone amplifier chip circuit, and the headphone interface is a 3.5 mm interface.

3. The USB game microphone with double sound card output devices according to claim 1, wherein the USB game microphone further comprises a touch switch and a light touch switch that are electrically connected to the master chip, the touch switch is used for controlling the mute switching of the microphone, and the light touch switch is used for switching the noise reduction of the microphone.

4. The USB game microphone with double sound card output devices according to claim 1, wherein the USB game microphone further comprises a USB interface by which the master chip is connected to an external connection device, and the USB interface is a TYPE-C interface.

5. The USB game microphone with double sound card output devices according to claim 1, wherein the USB game microphone further comprises a lamp control chip and a lamp effect switching switch that are electrically connected to the master chip, and the lamp control chip is electrically connected to lamp beads in a plurality of lamp areas.

6. The USB game microphone with double sound card output devices according to claim 1, wherein the USB game microphone further comprises a shell, a base, and a blowout control cover, the blowout control cover is mounted on a side of the shell, and the shell is rotatably mounted on the base by a rotary arm, and wherein the master chip, the headphone amplifier chip circuit and the microphone core are mounted inside the shell, the hybrid potentiometer, the microphone potentiometer is mounted on the shell, and forward and reverse ends of the hybrid potentiometer are respectively 100% outputs of the two sound cards.

* * * * *